United States Patent
Belyakov et al.

[11] Patent Number: 5,923,525
[45] Date of Patent: Jul. 13, 1999

[54] CAPACITOR WITH DOUBLE ELECTRIC LAYER

[75] Inventors: Alexei Ivanovich Belyakov; Alexandr Mikhailovich Bryntsev; Sergei Ivanovich Goridov; Igor Fedorovich Khovyakov, all of Kursk, Russian Federation

[73] Assignee: Aktsionernoe obschestvo "ELIT", Kursk, Russian Federation

[21] Appl. No.: 08/872,706

[22] Filed: Jun. 11, 1997

Related U.S. Application Data

[63] Continuation-in-part of application No. 08/505,217, filed as application No. PCT/RU94/00026, Feb. 14, 1994.

[30] Foreign Application Priority Data

Feb. 16, 1993 [RU] Russian Federation ............. 93008795

[51] Int. Cl.⁶ .................................................. H01G 9/00
[52] U.S. Cl. ........................... 361/502; 361/512; 361/503
[58] Field of Search ...................... 361/502, 503, 361/305, 504, 324, 510, 511, 516–520, 524, 512; 29/25.03; 429/129, 132, 209, 210, 194, 196, 197, 223, 247

[56] References Cited

U.S. PATENT DOCUMENTS

| | | | |
|---|---|---|---|
| D. 367,255 | 2/1996 | Rey ........................................ D13/103 |
| 4,327,400 | 4/1982 | Muranaka et al. ...................... 361/502 |
| 4,562,511 | 12/1985 | Nishino et al. .......................... 361/324 |
| 4,892,796 | 1/1990 | Chang et al. ............................. 429/196 |
| 5,085,955 | 2/1992 | Cipriano ................................... 429/197 |
| 5,115,378 | 5/1992 | Tsuchiya et al. ........................ 361/502 |
| 5,136,473 | 8/1992 | Tsuchiya et al. ........................ 361/502 |
| 5,147,739 | 9/1992 | Beard ....................................... 429/194 |
| 5,518,833 | 5/1996 | Repplinger et al. ....................... 429/59 |

FOREIGN PATENT DOCUMENTS

| | | |
|---|---|---|
| 13155/88 | 2/1991 | Australia . |
| 1 199 365 | 4/1986 | Canada . |
| 0 129 880 | 1/1985 | European Pat. Off. . |
| 0 514 545 | 11/1992 | European Pat. Off. . |
| 41 03 395 | 9/1991 | Germany . |
| 61-38584 | 10/1978 | Japan . |
| 60-26285 | 6/1985 | Japan . |
| 2 115 974 | 9/1983 | United Kingdom . |
| WO 92/12521 | 7/1992 | WIPO . |

OTHER PUBLICATIONS

Marcoux et al., "Development of a 100 Ah Rechargeable Li–SO₂ Cell" not considered, no date.
Bagotsky et al., "Chemical Electric Current Sources", Energoizdat Publishers, 1981, Moscow, pp. 290–291.
Electrotechnical Industry, Moscow, 1984; Chemical and Physical Electric Current Sources (collection of scientific and technical publications).

*Primary Examiner*—Kristine Kincaid
*Assistant Examiner*—Anthony Dinkins
*Attorney, Agent, or Firm*—Pennie & Edmonds LLP

[57] ABSTRACT

The invention is essentially a capacitor with a double electrical layer and including a housing, collecting metal plates secured under pressure within said housing, polarizable carbon electrodes, and separators permeated by an aqueous electrolyte. The collecting plates are of metal with a surface microhardness lower than the hardness of the material of the polarizable electrodes.

4 Claims, 1 Drawing Sheet

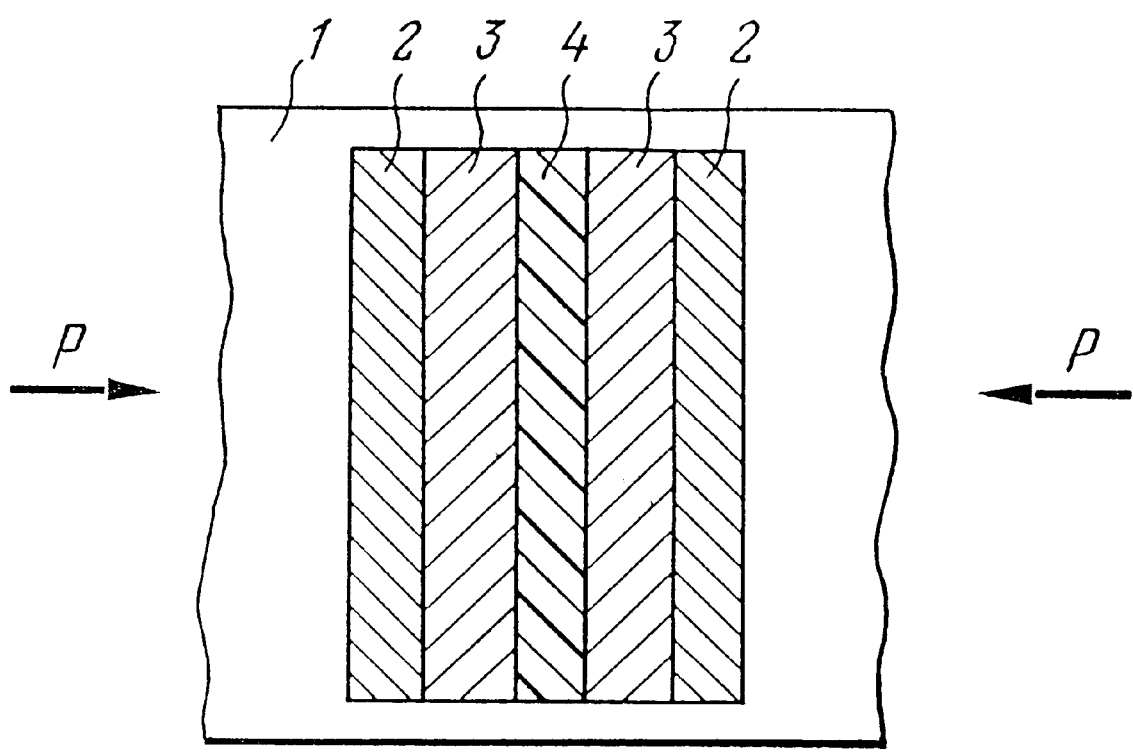

CAPACITOR WITH DOUBLE ELECTRIC LAYER

CROSS REFERENCE TO RELATED APPLICATIONS

This application is a continuation in part of U.S. patent application Ser. No. 08/505,217 filed Aug. 15, 1995 now abandoned, entitled CAPACITOR WITH DOUBLE ELECTRIC LAYER, which claims priority to the Russian Federation Application 93008795, filed Feb. 16, 1993. The corresponding PCT application was filed Feb. 14, 1994 as PCT/RU94/00026.

FIELD OF ART

The present invention relates to electrical engineering and, more specifically, to manufacture of capacitors with a double electric layer.

BACKGROUND OF THE INVENTION

The capacitors with a double electric layer developed in various countries have a very high specific and absolute electric capacity (molecular storage units, supercapacitors, "golden" capacitors ($C \approx 10^2–10^3$ F).

Known in the prior art is a capacitor with a double electric layer comprising a body with pressed-in collector plates, polarized carbon electrodes, and separators impregnated with aqueous electrolyte (see scientific and technological journal of abstracts "Electrical Engineering", Series "Chemical and Physical Current Sources", Moscow 1984, Issue 1 (94), p. 13).

Among the reasons hampering the attainment of the desired technical result in using this capacitor is its high internal resistance amounting to 2–10 Ohm/sq cm. It is caused by a high volume resistance of collector plates made from rubber heavily loaded with graphite (carbon black) which is 3–4 orders of magnitude higher than the resistance of metals.

The known capacitor having most relevant features is believed to be the capacitor with a double electric layer comprising a body with pressed-in metal collector plates of aluminum, polarized carbon electrodes and separators impregnated with electrolyte (See Japanese Application No. 60-26285, IPC HO16 9/00, publ. 1985).

One of the reasons interfering with the attainment of the desired technical result in using the known capacitor with a double electric layer in that this capacitor also has a high internal resistance.

The use of aluminum rules out the use of high conductivity aqueous electrolytes while the specific resistance of anhydrous solutions of ionogens is 12–40 times higher. The internal resistance in such systems exceeds 8 Ohm×sm$^2$.

SUMMARY OF THE INVENTION

An object of this invention is to provide a new capacitor with a double electric layer belonging to the known class of such capacitors but having the lowest internal resistance in the class.

Experiments have demonstrated that internal resistance of a capacitor with a double electric layer depends largely on the contact resistance between the polarized electrode and the collector.

If the polarized electrode is made of a carbon material (sorbent), the contact resistance depends on the area of contacts between the carbon particles and the collector. In turn, this area at a preset force of pressing the polarized electrode against the collector depends on microhardness of sorbent and the collector. The pressing force is limited by the strength of the materials used in capacitors with a double electric layer.

In the experimental cells of capacitors with double electric layers, having polarized electrodes made of carbon sorbent, collectors made of nickel and nickel alloys, and with aqueous electrolyte, the correlation between microhardness ($H\mu$) of the collector and internal resistance was determined. When $H\mu$ changes from 120 to 350 kg/mm$^2$ (from 1180 to 3440 N/mm$^2$), the resistance=Internal Resistance·S changes accordingly from 0.27 to 1.7 Ohm cm$^2$ (here S is the area of the cell of the capacitor with a double electric layer). The hardness of the carbon sorbent was 460–480 kg/mm$^2$ (4500–4710 N/mm$^2$).

The contact resistance in the above-mentioned prototype capacitor is determined by the contact area of carbon particles with the aluminum collector. In spite of softness of the basic material, its surface, consisting under any conditions (except vacuum) from aluminum oxide (corundum), features a high microhardness. For this reason, even under heavy compressive forces, the contact surface between a carbon fragment and metal is point-like and limits the passage of large currents.

Realization of the invention produces a highly powerful capacitor with a double electric layer permitting generation of strong discharge current pulses due to a low internal resistance.

This technical result is achieved by providing the known capacitor with a double electric layer comprising a body with pressed in metal collector plates, polarized carbon electrodes and separators impregnated with electrolyte wherein the collector plates are made of metals whose surface microhardness is lower than the hardness of the material of polarized electrodes and which are electrochemically resistant to aqueous electrolyte.

The capacitor with a double electric layer of this invention reduces the internal resistance due to the enlargent contact surface between the collector plate and the carbon electrode. This is achieved due to pressing the fragments of the carbon electrode into a milder material of the collector plate.

BRIEF DESCRIPTION OF THE DRAWING

The drawing illustrates a diagrammatic view of the capacitor of this invention.

DETAILED DESCRIPTION OF THE PREFERRED EMBODIMENT

The capacitor with a double electric layer comprises a body 1 with pressed-in metal collector plates 2, polarized carbon electrodes 3, and a separator 4 impregnated with aqueous electrolyte.

The use of high-conductivity aqueous electrolyte ensures a low specific resistance.

The collector plates are made of a metal which surface microhardness is lower than the hardness of the material of polarized electrodes.

A constant pressure—compressive force P—between the collector plates and polarized electrodes is ensured at assembly of the capacitor while the difference in hardness of compressed parts enlarges the contact area between the collector plates and polarized electrodes. This is caused by enveloping the parts of polarized material with a softer collector plate and by enlarging the current-transmitting surface.

The capacitor of this invention with the materials of the polarized electrode and collector matching each other from the viewpoint of their microhardness has substantial advantages in comparison to the prototype capacitor, namely:

it permits purposeful and objective selection of materials for the collector and polarized electrode in order to produce the preset internal resistance;

at preset internal resistance and voltage the capacitors with collectors of a low hardness will be lighter and smaller due to a reduced number of parallel-connected cells;

low internal resistance of the capacitor improves its electrical characteristics:

(a) maximum voltage on the load (R), connected to the capacitor, according to the formula $$U_R = \frac{U}{1 + \frac{r}{R}}$$

where U—voltage on Capacitor terminals with the load disconnected;

r—internal resistance;

(b) maximum short-circuit current which is required in the starting storage units;

(c) maximum power (W) applied to the load (R) and efficiency (K) of the storage unit according to the formulas:

$$W = \frac{U^2 R}{(R+r)^2} \qquad K = \frac{R}{(R+r)}$$

INDUSTRIAL APPLICABILITY

The range of probable applications of the capacitors with a double electric layer is quite wide, from weak-current electronics to heavy-current stationary and mobile electrical systems.

They are efficient both as capacitors proper and as energy storage units.

As capacitors proper, the double electric layer capacitors having a lighter weight and smaller size than the capacitors of other types can be used in ripple filters in the DC sources of powerful integrating and differentiating circuits as elements with a low reactive and active resistance at low-frequency current, in protection systems of superconducting magnets.

As storage units, capacitors with a double electric layer and a low internal resistance can serve as independent current sources instead of other sources, as well as in conjunction with other DC sources.

Tractive and starting energy storage units have been devised and are now being manufactured on the basis of the capacitors with a double electric layer.

The tractive capacitor-type energy storage units can be used with electric trolleys, electrorobocars, loaders, invalid wheelchairs, trolleys in hospitals and airports, etc. for recuperation of braking energy of transport facilities. The starting capacitor type-energy storage units are used for powering the starters of IC engines of passenger cars, cargo trucks, etc. under harsh conditions (frosts down to minus 50 C, thickening of lubricant).

As distinct from storage batteries, the capacitor-type energy storage units are ecologically safe, do not require any maintenance within their entire service life and are not damaged by a short circuit.

At present, the capacitor-type energy storage units work in the voltage range of 0.5–100 v, short-circuit current up to 30 kA, power capacity up to 100 kJ.

The mass and size being equal, the energy capacity of capacitor-type energy storage units is close to that of the storage batteries.

EXAMPLE

A capacitor with a double electric layer included a body made of stainless steel in the form of a shell with end face covers. Internal pressure was created by preliminary compression and fixation of the pressure during welding of the shell with the end face covers.

The collector plates were made of nickel foil having a thickness of 0.05±0.02 mm. The microhardness of the surface of nickel was $\leq 140$ kgf/mm$^2$ with a load on the indentor equal to 20 gf. The polarized electrodes in contact with the collector were produced from a fabric sorbent having a thickness of from 0.15 to 0.22 mm and a hardness of 460–480 kgf/mm$^2$.

A separator of non-fabric polypropylene impregnated with an aqueous solution of caustic potash having a concentration of 26–30% was disposed between the polarized electrodes.

A battery was assembled from the aforesaid elements (14 units) with an operating voltage of 12V, but one element with a voltage of from 0.8 to 1.0V can be used.

The whole capacitor assembly was fixed with a force of at least 6 kgf/sm$^2$. The maximum value of the force pressing the polarized electrodes against the collector plates should not exceed the value of compression failure of the electrode and separator.

The value of the specific resistance of capacitors of the claimed design varied within the range of from 0.19 to 0.27 ohm cm$^2$.

A 12V battery with a size of the electrodes equal to 120×140 mm had an impedance equal to $14 \cdot 10^{-3}$ ohm and the maximum discharge current was 800 A.

Operation of the capacitor with a double electric layer will permit obtaining heavy current discharge pulses due to a low internal resistance. This is achieved by the enlarged contact surface between the collector plate and carbon electrode and by the use of a high-conductivity aqueous electrolyte.

We claim:

1. A capacitor with a double electric layer comprising:

a first collector plate, a second collector plate spaced from the first collector plate, a body within which said collector plates are arranged under pressure, a first polarizable carbon electrode having hardness, permeated by an aqueous electrolyte and abutting the first collector plate, a second polarizable carbon electrode permeated by the aqueous electrolyte, abutting said second collector plate and having a hardness substantially equal to the hardness of said first carbon electrode, said first and second polarizable carbon electrodes arranged in said body under pressure, a separator permeated by the aqueous electrolyte and disposed between said first polarizable carbon electrode and said second polarizable carbon electrode under pressure, wherein said first collector plate and said second collector plate are made of a metal having a surface microhardness which is lower than said hardnesses of the polarizable carbon electrodes.

2. A capacitor of claim 1, wherein the metal from which said collector plates are made is electrochemically resistant to the electrolyte.

3. A capacitor of claim 1, wherein the metal from which said collector plates are made is nickel foil.

4. A capacitor of claim 2 wherein the metal from which said collector plates are made is nickel foil.

\* \* \* \* \*